US009229482B2

(12) United States Patent
Cheng et al.

(10) Patent No.: US 9,229,482 B2
(45) Date of Patent: Jan. 5, 2016

(54) LAPTOP COMPUTER HAVING A REAR COVER WITH LUMINOUS FULL-COLOR PATTERN

(71) Applicant: CLEVO Co., New Taipei (TW)

(72) Inventors: Cheng-Kuang Cheng, New Taipei (TW); Shen-Hsiang Lin, New Taipei (TW); Tsung-Yuan Wang, New Taipei (TW)

(73) Assignee: CLEVO CO., New Taipei (TW)

( * ) Notice: Subject to any disclaimer, the term of this patent is extended or adjusted under 35 U.S.C. 154(b) by 275 days.

(21) Appl. No.: 13/933,157

(22) Filed: Jul. 2, 2013

(65) Prior Publication Data

US 2015/0009448 A1    Jan. 8, 2015

(51) Int. Cl.
*G06F 1/16*    (2006.01)

(52) U.S. Cl.
CPC ............ *G06F 1/1656* (2013.01); *G06F 1/1616* (2013.01); *G06F 1/1684* (2013.01)

(58) Field of Classification Search
CPC ... G06F 1/1633; G06F 1/1616; G06F 1/1684; G06F 1/1656
USPC ............................. 349/58, 65, 68; 361/679.27
See application file for complete search history.

(56) References Cited

U.S. PATENT DOCUMENTS

| 2007/0130398 | A1* | 6/2007 | Halpin ........................... 710/62 |
| 2009/0009941 | A1* | 1/2009 | Hsu et al. ...................... 361/681 |
| 2011/0155007 | A1* | 6/2011 | Liu ................................ 101/368 |
| 2011/0267840 | A1* | 11/2011 | Wu ......................... G09F 13/22 362/611 |
| 2012/0050975 | A1* | 3/2012 | Garelli et al. ............. 361/679.27 |
| 2012/0293726 | A1* | 11/2012 | Takata .......................... 348/739 |

FOREIGN PATENT DOCUMENTS

TW    I374811 B1    10/2012

* cited by examiner

*Primary Examiner* — Dung Nguyen
*Assistant Examiner* — Tai Duong
(74) *Attorney, Agent, or Firm* — Bacon & Thomas, PLLC

(57) ABSTRACT

Disclosure herein is related to laptop computer having a rear cover with luminous full-color pattern. The look of laptop computer essentially includes a host body and a screen cover. The host body and the screen cover are pivotally connected. Within the host body of the laptop computer, an input unit, an output unit, power supply unit, and a mainboard are generally included. It is characterized in that the screen cover is constituted of a liquid crystal display panel, an active light source, and a rear cover printed with a pattern. The liquid crystal display panel and the active light source are respectively connected with the mainboard electrically. The active light source of the laptop computer allows generating various lighting modes no matter in booting the computer, in use, or in standby state. Furthermore, to cooperate with the pattern on the light-transmissive rear cover, a variety of esthetic visions are presented.

6 Claims, 4 Drawing Sheets

LAPTOP COMPUTER HAVING A REAR COVER WITH LUMINOUS FULL-COLOR PATTERN

BACKGROUND OF THE INVENTION

1. Field of the Invention

The present invention is generally related to a laptop computer having a rear cover with luminous full-color pattern; in particular, the disclosure is related to the computer's light-transmissive rear cover printed with a pattern and also with a changeable active light source.

2. Description of Related Art

With progressive development of the science technology, it is understood that the laptop computer shows substantial progress with advancement of technology. Not only the computer becomes more powerful to have faster capability of computation, but also becomes slimmer and easy to bring since the volume thereof is significantly reduced. It is noted that the laptop computer gradually takes place of the desktop computer in the recent years and is much acceptable to public when it provides competitive price.

The only thing is the development for the laptop computer just focuses on the above-mentioned points, and the researcher ignores the appearance development, at most to the texture or material of the top cover of the laptop computer. It is a pity that any change made to the laptop computer is slightly regarding to its texture or material.

A user may wish he owns the unique product when compared to others. Therefore, no matter to the mobile phone or tablet computer, the user may wish highlight his unique style and his own thing by filming a protective film, capping the product with a shell or hanging with adornment. It is understood that the user may not satisfy with the current products, and even show a lot of expectations for the any innovation and change to the notebook appearance.

In view of the computer manufacturers ignoring the significant changes to the present products, the applicant to the present application has granted a patent (Patent No. TWI374811) of TW Patent App. No. 098145823 tilted Plateless Transfer Printing Film, Appliance with Colorful Pattern and the Method of Manufacture thereof. One objective of this patent is to provide a method for manufacturing a plateless transfer sheet. In which, for uniformly transferring the sheet onto a surface, a roller fixture is incorporated to imprinting a plateless transfer film, and performing blowing pressure thereon. This method is to provide a solution when the conventional thermal transfer printing method fails to reach the uneven surface, or the surface with vertical angle, and also solve the drawback of blisters existed between the transfer film and the object resulting in uneven surface and easy to strip off in the conventional technologies.

The described patent still fails to allow the laptop computer to have various appearances since it merely provides simple flat illusion to the computer. Even if the prior arts provide some solutions, the users with higher demanding are still not content with those conventional technologies.

SUMMARY OF THE INVENTION

One major objective of the present invention is to provide a laptop computer having a rear cover with luminous full-color pattern. An active light source is incorporated to lighting no matter the laptop computer is in booting phase, in shutdown phase, in standby state, or in normal operation. The active light source allows the laptop computer to generate various lighting for providing experiencing new and various illusions.

One further objective of the present invention is to provide the laptop computer with the luminous full-color pattern formed on its rear cover. The variation of lighting may be cooperated with various sound effects for generating much better acousto-optic effects.

Still, one objective of the present invention is to provide the laptop computer with luminous full-color pattern rear cover printed with a pattern. The changes of acousto-optics may simultaneously be cooperated with various sound effects.

One further embodiment of the present invention is to provide the laptop computer, in which in addition to the light source is disposed outside the rear plate of the screen body, one other light source responsive to the mentioned light source may be disposed onto the host body.

In order to achieve the above-mentioned objectives, the laptop computer having a light-transmissive rear cover printed with a luminous full-color pattern. According to one of the embodiments, the laptop computer is essentially made of a host body and a screen cover. The host body and the screen cover are pivotally connected.

The host body includes an input unit, an output unit, a power supply unit and a mainboard, which are required by the common laptop computer. It is characterized that the screen cover is essentially consisted of a liquid crystal display panel, an active light source, and a light-transmissive rear cover printed with a pattern. The liquid crystal display panel and the active light source are respectively connected to the mainboard electrically.

The following detailed description and related drawings are disclosed to clearly describe the laptop computer with a light-transmissive rear cover with a luminous full-color pattern.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
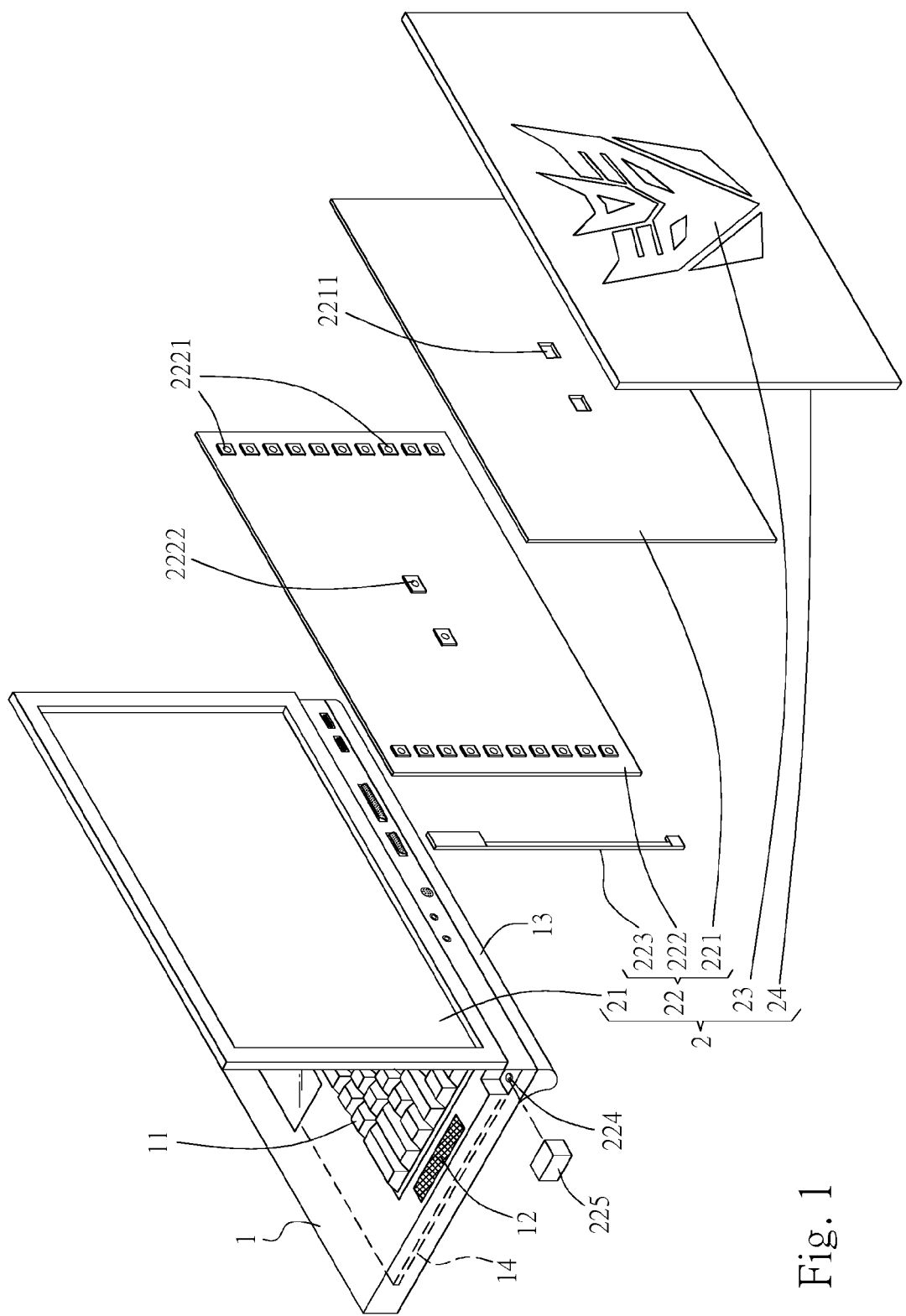
FIG. 1 shows a schematic diagram of an exploded perspective view of the computer in accordance with the present invention.
Figure 2:
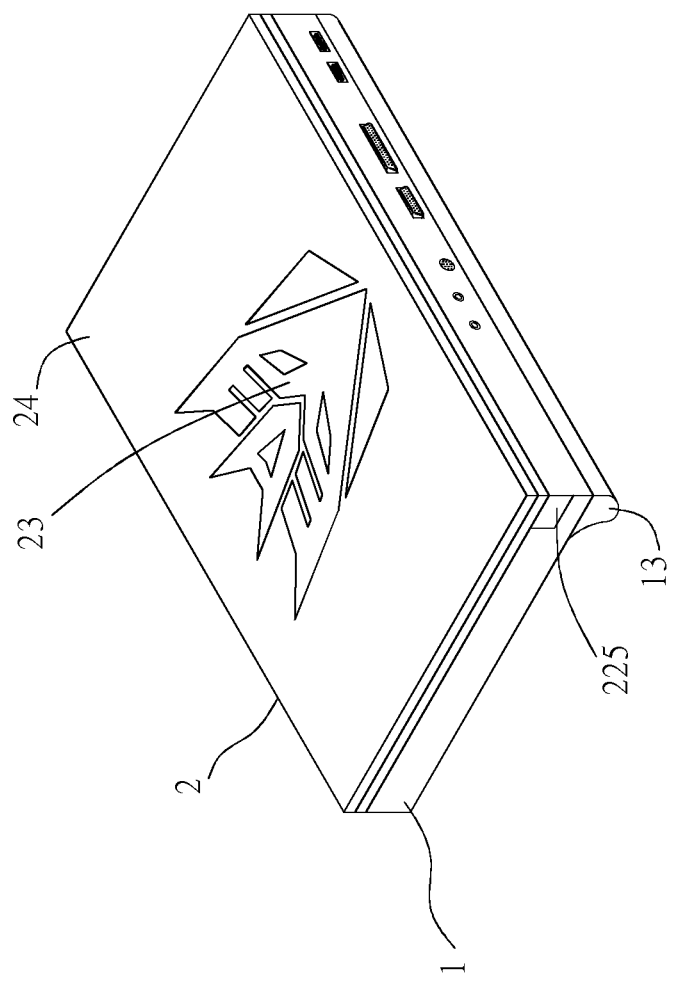
FIG. 2 shows a diagram of perspective view of assembly of the computer in accordance with the present invention.

References now are made to FIG. 1 and FIG. 2, which are respectively depicting an exploded perspective diagram and a diagram of perspective view of assembly of the computer in accordance with the present invention. The laptop computer printed with the luminous full-color pattern is disclosed.

The laptop computer is essentially made of a host body 1 and a screen cover 2. The host body 1 and the screen cover 2 are pivotally connected. The host body 1 includes an input unit 11, an output unit 12, a power supply unit 13, and a mainboard 14, which are the essential elements usually included in a computer. It is characterized in that the screen cover 2 is essentially made of a liquid crystal display panel 21, an active light source 22, and a light-transmissive rear cover 24 on which a pattern 23 is printed. The liquid crystal display panel 21, the active light source 22 are respectively connected to the mainboard 14 of the host body 1, and therefore allowing the active light source 22 to be powered by the power supply unit 13 over the mainboard 14.

The light-transmissive rear cover 24 printed with the pattern 23 as described above is preferably made by a light-transmissive plastic material. For example, the preferred material is such as Polycarbonate (PC) SABIC 9925A which is featured to have high transparency and high strength.

While the laptop computer is in booting, in shutdown process, or in standby state, the light-transmissive rear cover 24 of the laptop computer allows the light generated by the active light source 22 disposed inside the cover 24 to pass through the cover 24 directly. Therefore, the pattern 23 printed onto the surface of cover 24 may be much clear and beautiful.

The pattern 23 on the rear cover 24 may be formed by various schemes. For example, the pattern 23 may be directly printed onto the rear cover 24, formed by a transfer printing process, or pasted with a patterned transparent film. Even though the different ways to form the pattern 23 onto the rear cover 24 may appear different visions, the present invention may be able to provide a certain level of visual effect. It is worth noting that the plateless transfer printing is the preferred solution to form the pattern 23.

Further, the active light source 22 is essentially consisted of a light-guide plate 221, a LED board 222, and a connection unit 223. The LED board 222 is equipped with a plurality of LEDs 2221. Two ends of the connection unit 223 are respectively connected with the LED board 222 and the mainboard 14 electrically. The light-guide plate 221 is disposed in between the LED board 222 and the rear cover 24 printed with the pattern 23. According to user's configuration, the mainboard 14 is operated to drive the LEDs 2221 of the LED board 222 to generate various lighting effects when the laptop computer may be in one of the various operating processes. Through the light-guide plate 221, it also provides visual effects with combination of colors. The active light source 22 may also generates intermittent flashes.

Still further, the active light source 22, under control of the mainboard 14, may generate variation of lighting as it is cooperated with the active light source generating intermittent flashes operated with melody and rhythm as playing music. Therefore, the computer provides much more vivid and powerful acousto-optic effects.

Figure 3:
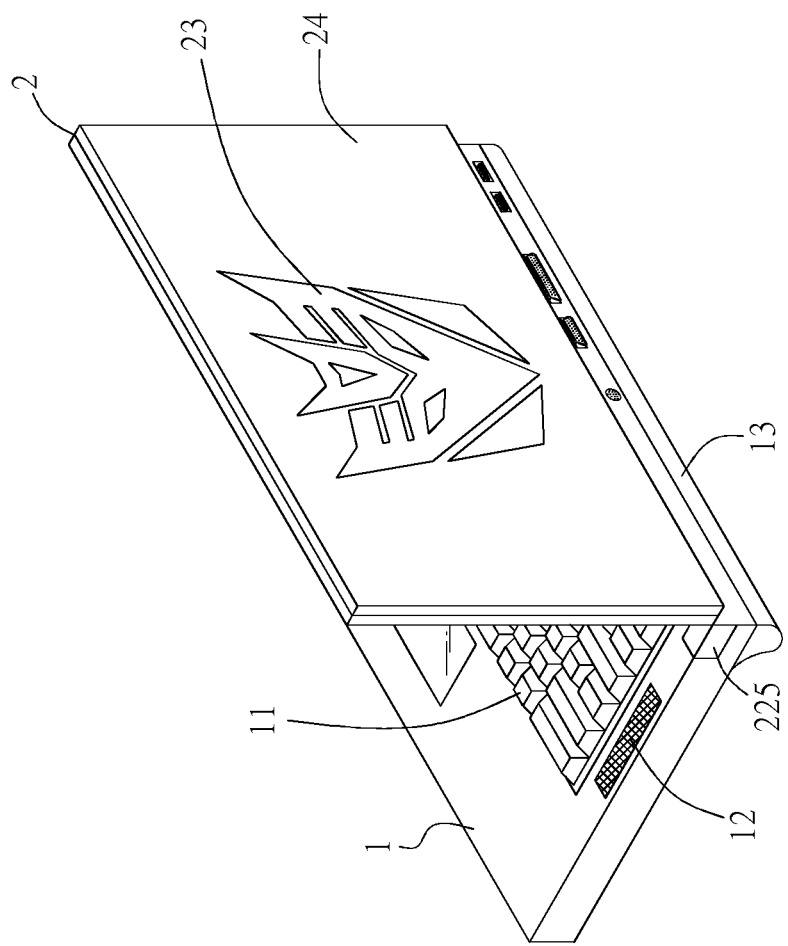
FIG. 3 is a schematic diagram according to one of the embodiments of the present invention.

Further, the LEDs 2221 of LED board 222 may be cooperated with different patterns 23. For example, if the pattern 23 appeared as a transformer in FIG. 3 is formed onto the light-transmissive rear cover 24; the LEDs 2222 of the LED board 222 may be positioned corresponding to the positions of eyes of the transformer pattern (23). The related light-guide plate 221 may also be disposed with the corresponding through holes 2211. While the laptop computer is in operation, the eyes of the transformer (23) may illuminate greater amount of lights. Therefore, the much more vivid vision is provided.

Figure 4:
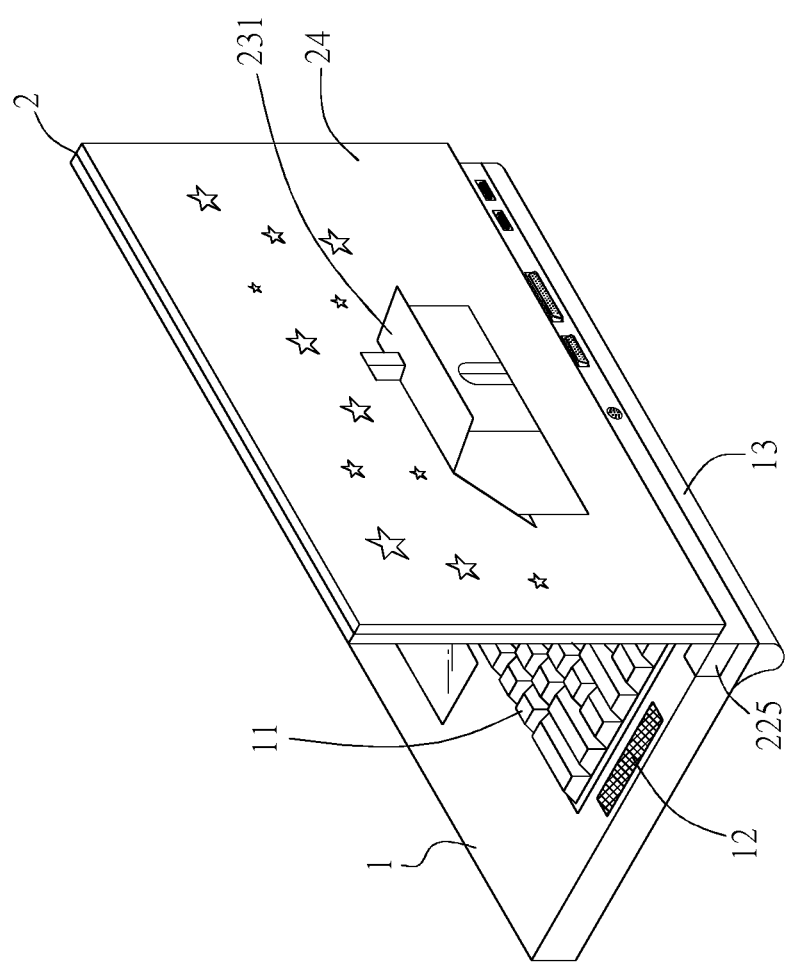
FIG. 4 shows a schematic diagram describing one further embodiment of the present invention.

Reference next is to FIG. 4 depicting one further embodiment of the present invention. It is shown a pattern 231 of night sky having a plurality of stars. On the LED board 222, the pluralities of LEDs (not shown in this figure) are positioned with respect to the positions of the stars. The light-guide plate 221 is also disposed with respect to through holes disposed thereon. When the laptop computer starts, some visual effects are variously presented at the positions with the stars. For example, the LEDs with respect to the positions of stars are flashing intermittently, flashing at the same time, or flashing in groups alternately.

In the structure of the computer, in addition to the active light source 22 is disposed within the screen cover 2, two additional lighting elements 224 may be disposed on the two external sides of the host body 1, and also cooperated with the light-transmissive housing 225. The assembly of the active light source 22 and the lighting elements 224 with the light-transmissive rear cover 2 may generate much better acousto-optic effects.

It is featured that, in accordance with the preferred embodiment of the present invention, the active light source 22 is installed within the light-transmissive rear cover printed with the pattern. While the active light source 22 is under control of the mainboard 14, the variant lighting effects with the pattern are generated according to the user's configuration as operating the laptop computer. The variation of lighting may be cooperated with various sound effects for generating much better acousto-optic effects.

It is noted that the foregoing descriptions are merely used to illustrate some embodiments of the present invention, but not used to limit the invention while it is applicable to other applications or making equivalent modifications. For example, the mentioned LEDs in the active light source may be replaced with other types of lighting elements such as a luminescent panel.

In summation of the disclosure of the present invention, the laptop computer having the rear cover with luminous full-color pattern is principally applied to providing an aspect of disposing an active light source into the light-transmissive rear cover rather than the general unchanging design of the rear cover used for the legacy laptop computer. The active light source is under control of the mainboard of the whole system, and to make the rear cover to generate various lighting according to the user's configuration when the computer is in operation. The laptop computer therefore provides the excellent acousto-optic effect.

It is intended that the specification and depicted embodiment be considered exemplary only, with a true scope and spirit of the invention being indicated by the broad meaning of the following claims.

What is claimed is:
1. A laptop computer having a rear cover with luminous full-color pattern, wherein the laptop computer is essentially consisted of a host body and a screen cover, the host body and the screen cover are pivotally connected, and the host body comprises an input unit included in the laptop computer, an output unit, a power supply unit; and a mainboard;

characterized in that the screen cover is essentially consisted of a liquid crystal display panel, an active light source, a light-transmissive rear cover printed with a pattern, in which the liquid crystal display panel and the active light source are respectively connected to the mainboard of the host body electrically;

wherein the active light source is under control of the mainboard; the active light source generates intermittent flashes operated with melody and rhythm as playing music.

2. The laptop computer of claim 1, wherein the light-transmissive rear cover with printed pattern is made of a light-transmissive plastic material.

3. The laptop computer of claim 2, wherein the plastic material is Polycarbonate (PC).

4. The laptop computer of claim 1, wherein the active light source is made of a light-guide plate, an LED board, and a connection unit; the LED board is equipped with a plurality of LEDs, two ends of the connection unit are respectively connected with the LED board and the mainboard electrically, and the light-guide plate is disposed in between the LED board and the light-transmissive rear cover.

5. The laptop computer of claim 1, wherein, in addition to the active light source is disposed inside the screen cover, the active light source further includes two lighting elements disposed at two external sides of the host body, and with a light-transmissive housing.

6. The laptop computer of claim 1, wherein the pattern on the light-transmissive rear cover is formed by directly transfer-printing a plateless transfer film onto the cover.

\* \* \* \* \*